P. MUELLER.
SEAL FOR SERVICE COCKS.
APPLICATION FILED DEC. 28, 1911.
1,038,183.
Patented Sept. 10, 1912.
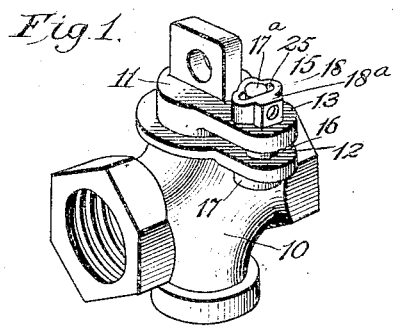
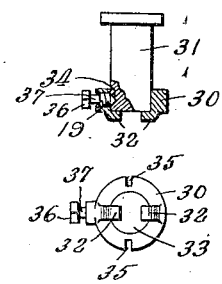
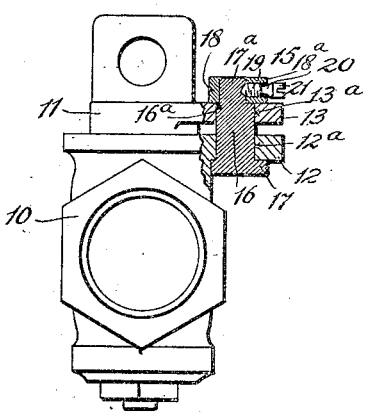
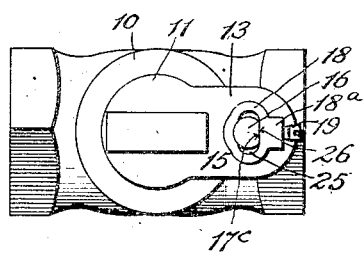
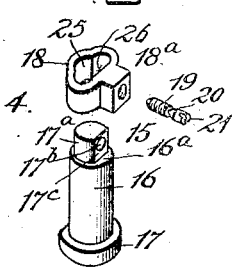
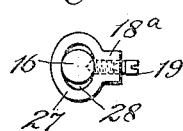
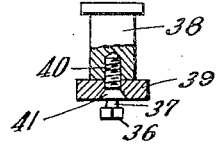
Witnesses
Inventor
PHILIP MUELLER
By
Attorneys

UNITED STATES PATENT OFFICE.

PHILIP MUELLER, OF DECATUR, ILLINOIS, ASSIGNOR TO H. MUELLER MANUFACTURING COMPANY, OF DECATUR, ILLINOIS, A CORPORATION OF ILLINOIS.

SEAL FOR SERVICE-COCKS.

1,038,163.  Specification of Letters Patent.  Patented Sept. 10, 1912.

Application filed December 28, 1911. Serial No. 668,367.

*To all whom it may concern:*

Be it known that I, PHILIP MUELLER, a citizen of the United States, residing at Decatur, in the county of Macon and State of Illinois, have invented new and useful Improvements in Seals for Service-Cocks, of which the following is a specification.

This invention relates to an improvement in seals or locking means for use on cocks in connection with gas and water service, and is shown and described herein as being applied to what is known to the trade as lock-wing gas cocks, in which a wing is cast on the cock body and a similar wing on the key for the same, said wings being so positioned with respect to each other, that when the cock is in closed position, holes, which are bored in the wings, register with each other and thus make it possible to attach a padlock to such a cock by passing the bow of the lock through said holes and thus lock the cock in a closed position, making it impossible to tamper with the same, unless the padlock is maliciously opened, broken or stolen. This method of locking the gas cocks is expensive, not only because the cost of a good padlock is nearly equal to that of the cock itself, but such locks are liable to be opened by persons criminally inclined, and the cock turned on and the gas used without authority or knowledge of the company that furnished the gas or water. This difficulty, however, is overcome in the present invention by means of a cheap and practical locking and sealing device for the cock key comprising a headed pin designed to be passed through the holes in the wings and there fastened in such manner, by a sealing member, that it cannot be removed without breaking said sealing member which, for this purpose, is made of frangible material.

This invention, although designed primarily for use on gas cocks and will be so described in connection therewith throughout this specification, may be with equal advantage applied to other kinds of cocks, such as are used for regulating the flow of water and oil, and also to other articles and in other situations than that to which the specific embodiment herein described is adapted. It is well known that there are gas lock wing cock seals of various kinds in use at the present time, and serving the same purpose as a padlock, and these are objectionable for several reasons. Most of them are quite expensive and difficult to make, and when frequent renewals are required, owing to the number of times which the cocks must be opened and closed on some occasions, the expense involved in renewing these seals alone amounts to a considerable item. Furthermore, most of these seals require special tools to affix them to the cock, or special rivets are necessary, and the expense of providing these articles must be taken into consideration.

The object of the invention, therefore, is to provide a frangible combined lock and sealing member for its intended purposes which shall be cheap and efficient and which may be easily and quickly applied by the use of a simple tool in a few minutes, and which, when applied, securely locks and seals the parts against movement without breaking said member, which will be difficult and troublesome to duplicate.

This invention will be more readily understood by referring to the following detail description in connection with the accompanying drawings, in which—

Figure 1 is a perspective view of a gas cock with the sealing device applied thereto. Fig. 2 is an end view of a cock, the locking and sealing member and a portion of the cock being shown in section. Fig. 3 is a top plan view of a cock locked and sealed. Fig. 4 is a perspective view of the several parts of the lock and seal separated. Fig. 5 is a plan view of a modified form of the lock and seal. Figs. 6, 7 and 8 are views of other modified forms of the invention.

Referring to the drawings, the numeral 10 designates the gas cock body, of well known type, and 11 the turning key therefor. Projecting laterally from the side of the gas cock and flush with the opening into which the key 11 enters is a wing or projection 12 cast on the cock body with a hole 12$^a$ therethrough. A similar wing 13 having a hole 13$^a$ extends laterally from the key 11 in such position as to be parallel with the latter wing when the cock is turned to full cut-off position, in which position the holes 12$^a$ and 13$^a$ will aline.

The wings 12 and 13 when placed in parallelism are secured together so that neither key nor cock body can be turned relatively to each other, by means of a locking member

15 which, in the present instance, is in the form of a pin 16, made of iron, steel or some other suitable material, on one end of which is a head 17, the other end 17ᵃ may be slightly reduced in diameter to form a shoulder 16ᵃ as shown in Figs. 2 and 4. A depression 17ᵇ is formed in one side of the end of said pin which side will, in some instances, be flattened as at 17ᶜ. The pin 16 is inserted in the holes 12ᵃ and 13ᵃ with its head bearing against the under side of the wing 12, and its opposite end projecting beyond the other wing with the depression 17ᵇ facing outwardly.

A frangible collar 18 which may have a lug 18ᵃ is placed on the projecting end of the pin and fastened thereto by a screw 19 having a weakened portion 20 just below its head or slotted end 21. The screw 19 is screwed through the complementally threaded collar and its lug 18ᵃ, if it has one, and by tightening said screw, its inner end engages the depression 17ᵇ in the pin, thus fastening the collar in place thereon. The head of the screw is then broken off within the threaded portion of the collar thus making it impossible to remove the screw and sealing the movable parts of the cock. When the pin 16 is made with a reduced end to form the shoulder 16ᵃ, its length is such that the shoulder reaches to the top, or slightly above the top surface of the wing 13 to form a rest for the collar 18, which shoulder together with the bottom of the collar serves to locate or position the point of the set screw 19 with relation to the depression 17ᵇ in the pin.

The collar 18 may be made in different shapes and have various forms of openings therethrough for the pin 16. In Figs. 1, 3 and 4 the collar somewhat resembles a trefoil in outline with a similar shaped opening 25 therethrough having a flat side 26 that bears against the flat side 17ᶜ of the pin 16 and a curved surface opposite which bears against its curved side. At opposite lateral sides of the collar the opening 25 is spaced from the pin as shown to permit the collar being broken by a pair of pliers, a hammer or other tool.

Fig. 5 shows an elliptical collar 27 with a like shaped opening 28 the short axis of which opening is substantially the diameter of the pin while the long axis is greater, thus leaving a space on each side of the pin for breaking purposes. Other shapes of openings may be employed provided a bearing surface is furnished to take the thrust of the screw 19 and oppositely disposed portions of the collar be spaced from the pin.

In Figs. 6 and 7 the frangible collar 30 is designed to be used in connection with a pin 31 of uniform diameter throughout its length, over the end of which the collar is slipped. Oppositely disposed lugs 32 on the top of the collar project over the opening 33 therethrough to rest on the end of the pin and hold the collar in position thereon to bring the end of the screw 19 opposite the depression 34 in the side of said pin that it may be screwed thereinto without trouble. To increase the frangibility of the collar, notches 35 may be made in the outer periphery of the same. Instead of slotting the head of the screw 19, as in Figs. 2, 3, 4 and 5, the head 36 may be polygonal, or like a bolt head, and the body weakened as at 37, between the head and thread, to permit the head being broken off.

In the modification represented in Fig. 8, the bolt 38 is shorter and barely projects above the wing 13 of the cock key. Placed over the end of the pin is a frangible collar 39 made in this instance like a washer with a central hole for a screw 40 threaded into a complementally threaded axial hole in the bolt. The screw may be formed with a tapered collar 41 to enter a similarly shaped counter-sink in the washer 39 for holding the latter in position on the end of the pin. A head 36 similar to that on the screw of Figs. 6 and 7 is provided, and the body similarly weakened at 37 between the head and the tapered collar so that the head may be broken off and the screw rendered irremovable.

A locking and sealing member such as above described offers greater security against opening the cock without detection than a padlock now commonly employed, and is also much cheaper. The member must be broken before the cock can be used again, and as these members are in the possession only of authorized persons, it is quite difficult to replace one, if broken, by a person criminally inclined to use the gas or other fluid flowing through the cock.

Having fully described my invention what I claim as new is:

1. In combination with a cock body having a perforated wing, and a cock key having a similar wing adapted to be brought into parallelism with the wing on the cock body and perforations therein into line, of a locking member comprising a smooth pin passing through said perforations to hold the key and cock body against relative movement, a frangible collar mounted on said pin, and a screw for connecting said collar to the pin, said screw having a weakened portion intermediate its ends whereby its headed end may be broken off below the surface of the collar.

2. In combination with a cock body having a perforated wing, and a cock key having a similar wing adapted to be brought into parallelism with the wing on the cock body and the perforations therein into line, of a locking member comprising a smooth surfaced pin passing through said perforations to hold the key and cock body against relative movement, a frangible collar mounted on the end of said pin, and a screw threaded into said collar to bear against said pin for retaining said collar and pin in place, said screw having a weakened portion intermediate its ends whereby its headed end may be broken off below the surface of the collar.

3. In combination with a cock body having a perforated wing, and a cock key having a similar wing adapted to be brought into parallelism with the wing on the cock body and the perforations therein into line, of a locking member comprising a headed pin having a smooth body passing through said perforations to hold the key and cock body against relative movement, a frangible collar having an elongated opening therethrough for the end of said pin to provide breaking spaces on opposite sides of the pin, and a screw threaded into said collar to bear against said pin for retaining both collar and pin in place on the wings, said screw having a weakened portion intermediate its ends whereby its headed end may be broken off below the surface of the collar.

4. In combination with a cock body having a perforated wing and a cock key having a similar wing adapted to be brought into parallelism with the wing on the cock body and the perforations therein into line, of a locking member comprising a headed pin passing through said perforations and projecting beyond the same, a frangible collar having an opening therethrough for the end of the pin, said opening being longer in one direction to form breaking spaces between the collar and the pin on opposite sides of the pin, and a screw threaded into said collar and engaging the pin for retaining said collar and pin in place on the cock, said screw having a groove formed therein intermediate its ends which will permit the headed end to be broken off below the surface of the collar.

5. In combination with a cock, the body and key of which have each a perforated wing adapted to be brought into alinement, a pin adapted to be passed through the perforations in the wings and project beyond the same, said projecting portion having a flattened side and depression therein, a collar on said projecting portion of the pin and contacting therewith on opposite sides, other portions of said collar being spaced from the pin, and a screw having a weakened portion which may be broken off after being seated, threaded into said collar and into a depression in said pin.

6. In combination with a cock, the body and key of which have each a perforated wing adapted to be brought into alinement, a pin adapted to be passed through the perforations in the wings and project beyond the same, said projecting portion having a depression on its side and reduced in diameter to form a shoulder on the pin in close relation to the outer surface of the adjacent wing, a collar mounted on said projecting portion of the pin and a screw having a weakened portion by means of which the screw head can be easily broken off after its point has been seated in said depression, said shoulder forming a stop for the collar whereby to locate the point of said screw in line with the depression in the pin.

7. A locking and sealing device comprising a pin for engaging the parts to be locked, a frangible collar adapted to fit over said pin after positioning the pin, and means carried by said collar for irremovably connecting the collar to the pin.

8. A locking and sealing device comprising a pin for engaging the parts to be locked, a frangible collar adapted to fit over said pin after positioning the pin, means for limiting the longitudinal position on the pin of said collar, and means carried by the collar for irremovably connecting the collar to the pin.

9. A locking and sealing device comprising a headed pin, a frangible collar adapted to fit over the end of said pin and spaced therefrom at certain portions to weaken the collar, and a screw threaded into said collar to engage said pin, said screw having a weakened portion in its stem to permit its head being broken off below the surface of the collar, thereby rendering the collar irremovable.

In testimony whereof I have hereunto set my hand in presence of two subscribing witnesses.

PHILIP MUELLER.

Witnesses:
WILLIAM R. BIDDLE,
CATHERINE E. MCKEOWN.